US012755343B2

(12) United States Patent
Ma

(10) Patent No.: US 12,755,343 B2
(45) Date of Patent: Oct. 6, 2026

(54) IMAGE PROCESSING METHOD, ELECTRONIC DEVICE, AND STORAGE MEDIUM

(71) Applicant: Zhuhai Pantum Electronics Co., Ltd., Zhuhai (CN)

(72) Inventor: Yangxiao Ma, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 412 days.

(21) Appl. No.: 18/486,066

(22) Filed: Oct. 12, 2023

(65) Prior Publication Data

US 2024/0153042 A1 May 9, 2024

(30) Foreign Application Priority Data

Nov. 9, 2022 (CN) ......................... 202211400553.7

(51) Int. Cl.
*G06T 5/50* (2006.01)
*G06T 7/11* (2017.01)

(52) U.S. Cl.
CPC .................. *G06T 5/50* (2013.01); *G06T 7/11* (2017.01); *G06T 2207/20021* (2013.01); *G06T 2207/20221* (2013.01); *G06T 2207/30168* (2013.01)

(58) Field of Classification Search
CPC ... G06T 5/50; G06T 7/11; G06T 2207/20021; G06T 2207/20221; G06T 2207/30168
See application file for complete search history.

(56) References Cited

U.S. PATENT DOCUMENTS 8,774,534 B2 * 7/2014 Zarom ................... H04N 19/90 382/209
9,373,154 B2 * 6/2016 Chen ......................... G06T 1/60
(Continued)

FOREIGN PATENT DOCUMENTS

CN 105741300 A 7/2016
CN 108460730 A 8/2018
(Continued)

OTHER PUBLICATIONS

The European Patent Office (EPO) The Extended European Search Report for 23207233.0 Mar. 4, 2024 9 Pages.
(Continued)

*Primary Examiner* — Gregory M Desire
(74) *Attorney, Agent, or Firm* — Anova Law Group, PLLC

(57) ABSTRACT

An image processing method includes: performing a first division on an acquired preprocessed image to obtain a plurality of first sub-image regions; when it is determined that image parameters of the plurality of first sub-image regions do not meet a first preset condition, performing a second division on the plurality of first sub-image regions, to obtain a plurality of second sub-image regions; performing attribute identification on each second sub-image region of the plurality of second sub-image regions to obtain an identification attribute of each second sub-image region; according to an image processing method corresponding to the identification attribute of each second sub-image region, performing image processing on the second sub-image region to obtain a third sub-image region; and merging a plurality of third sub-image regions to obtain a target image.

20 Claims, 8 Drawing Sheets

(56) References Cited

U.S. PATENT DOCUMENTS

| | | | | |
|---|---|---|---|---|
| 10,290,108 B2 * | 5/2019 | Zhang | G06T 5/70 |
| 11,257,228 B1 * | 2/2022 | Jeon | G06T 3/14 |
| 11,563,899 B2 * | 1/2023 | Penn | H04N 23/76 |
| 11,651,229 B2 * | 5/2023 | Cheng | G06V 10/50 382/118 |
| 2019/0043201 A1 | 2/2019 | Strong et al. | |
| 2020/0334793 A1 | 10/2020 | Chen et al. | |
| 2021/0289116 A1 | 9/2021 | Miyata et al. | |

FOREIGN PATENT DOCUMENTS

| | | |
|---|---|---|
| CN | 110087063 A | 8/2019 |
| CN | 111369512 A | 7/2020 |
| CN | 114359304 A | 4/2022 |
| WO | 2022047719 A1 | 3/2022 |

OTHER PUBLICATIONS

Farhad Keissarian: “A new quad-tree segmented image compression scheme using histogram analysis and pattern matching”, Computer and Automation Engineering (ICCAE), 2010 The 2nd International Conference On, IEEE, Piscataway, NJ, USA, Feb. 26, 2010, pp. 694-698.

* cited by examiner

IMAGE PROCESSING METHOD, ELECTRONIC DEVICE, AND STORAGE MEDIUM

CROSS-REFERENCE TO RELATED APPLICATION

This application claims the priority of Chinese Patent Application No. 202211400553.7, filed on Nov. 9, 2022, the content of which is incorporated herein by reference in its entirety.

TECHNICAL FIELD

The present disclosure generally relates to the field of image processing technology and, more particularly, relates to an image processing method, an electronic device, and a storage medium.

BACKGROUND

With the development of imaging technology, image forming devices like laser printers and inkjet printers have been widely used. During the imaging process, an image forming device is able to process images through a controller. For example, the controller may be a system-on-chip (SoC).

When the image forming device needs to process a large-format image, the limitation of controller resources will affect the processing effect and performance of large-format image, resulting in low image processing efficiency, poor image processing effects, and high system resource occupation.

SUMMARY

One aspect of the present disclosure provides an image processing method. The image processing method includes: performing a first division on an acquired preprocessed image to obtain a plurality of first sub-image regions; when it is determined that image parameters of the plurality of first sub-image regions do not meet a first preset condition, performing a second division on the plurality of first sub-image regions, to obtain a plurality of second sub-image regions; performing attribute identification on each second sub-image region of the plurality of second sub-image regions to obtain an identification attribute of each second sub-image region; according to an image processing method corresponding to the identification attribute of each second sub-image region, performing image processing on the second sub-image region to obtain a third sub-image region; and merging a plurality of third sub-image regions to obtain a target image.

Another aspect of the present disclosure provides an electronic device. The electronic device includes one or more processors, and a memory storing computer program instructions that, when being executed, cause the one or more processors to: perform a first division on an acquired preprocessed image to obtain a plurality of first sub-image regions; when it is determined that image parameters of the plurality of first sub-image regions do not meet a first preset condition, perform a second division on the plurality of first sub-image regions, to obtain a plurality of second sub-image regions; perform attribute identification on each second sub-image region of the plurality of second sub-image regions to obtain an identification attribute of each second sub-image region; according to an image processing method corresponding to the identification attribute of each second sub-image region, perform image processing on the second sub-image region to obtain a third sub-image region; and merge a plurality of third sub-image regions to obtain a target image.

Another aspect of the present disclosure provides a non-transitory computer-readable storage medium. The storage medium is configured to store a program; and when the program is executed, a device where the computer-readable storage medium is located is configured to: perform a first division on an acquired preprocessed image to obtain a plurality of first sub-image regions; when it is determined that image parameters of the plurality of first sub-image regions do not meet a first preset condition, perform a second division on the plurality of first sub-image regions, to obtain a plurality of second sub-image regions; perform attribute identification on each second sub-image region of the plurality of second sub-image regions to obtain an identification attribute of each second sub-image region; according to an image processing method corresponding to the identification attribute of each second sub-image region, perform image processing on the second sub-image region to obtain a third sub-image region; and merge a plurality of third sub-image regions to obtain a target image.

In the present disclosure, when it is determined that the image parameters of the plurality of first sub-image regions obtained by division do not meet the first preset condition, the second division may be performed on the plurality of first sub-image regions again to obtain the plurality of second sub-image regions. Then, according to the image processing method corresponding to the identification attribute of each second sub-image region, image processing may be performed on the second sub-image region to obtain one corresponding third sub-image region. The obtained plurality of third sub-image regions may be merged to obtain the target image. Different image processing methods may be performed for regions with different identification attributes, and parallel processing of regions with different identification attributes may be realized, thereby improving image processing efficiency and effects and solving the problem of excessive system resource occupation.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. The embodiments disclosed herein are exemplary only. Other applications, advantages, alternations, modifications, or equivalents to the disclosed embodiments are obvious to those skilled in the art and are intended to be encompassed within the scope of the present disclosure.

It should be noted that the terms used in the embodiments of the present disclosure are only for the purpose of describing specific embodiments, and are not intended to limit the scope of the present disclosure. As used in the embodiments of the present disclosure and the appended claims, the singular forms such as "a", "said" and "the" are also intended to include the plural forms unless the context clearly indicates otherwise.

It should be understood that the term "and/or" used in this specification is just for relationship description of related objects, indicating that there can be three kinds of relationships. For example, A and/or B, which can mean that A exists alone, A and B exist at the same time, and B exists alone. In addition, the character "/" in this specification generally indicates that the related objects are in an "or" relationship.

The present disclosure provides an image processing method, and the method may be applied to an image forming device. The image forming device may include: an inkjet printer, a laser printer, a light emitting diode (LED) printer, a copier, a scanner, an all-in-one facsimile machine, or a multi-functional peripheral (MFP) that is able to execute the above functions in a single device. The image forming device may include an image forming control unit and an image forming unit. The image forming control unit may be configured to control the image forming device as a whole, and the image forming unit may be configured to form images on conveyed paper under the control of the image forming control unit based on image forming data and developers such as toner stored in consumables.

The present disclosure provides an image processing method, and the method may be applied to an electronic device. The electronic device may include a device capable of image processing, for example, the electronic device may include but is not limited to a mobile phone, a tablet computer, a notebook computer, a desktop computer, a smart TV, and the like.

Figure 1A:
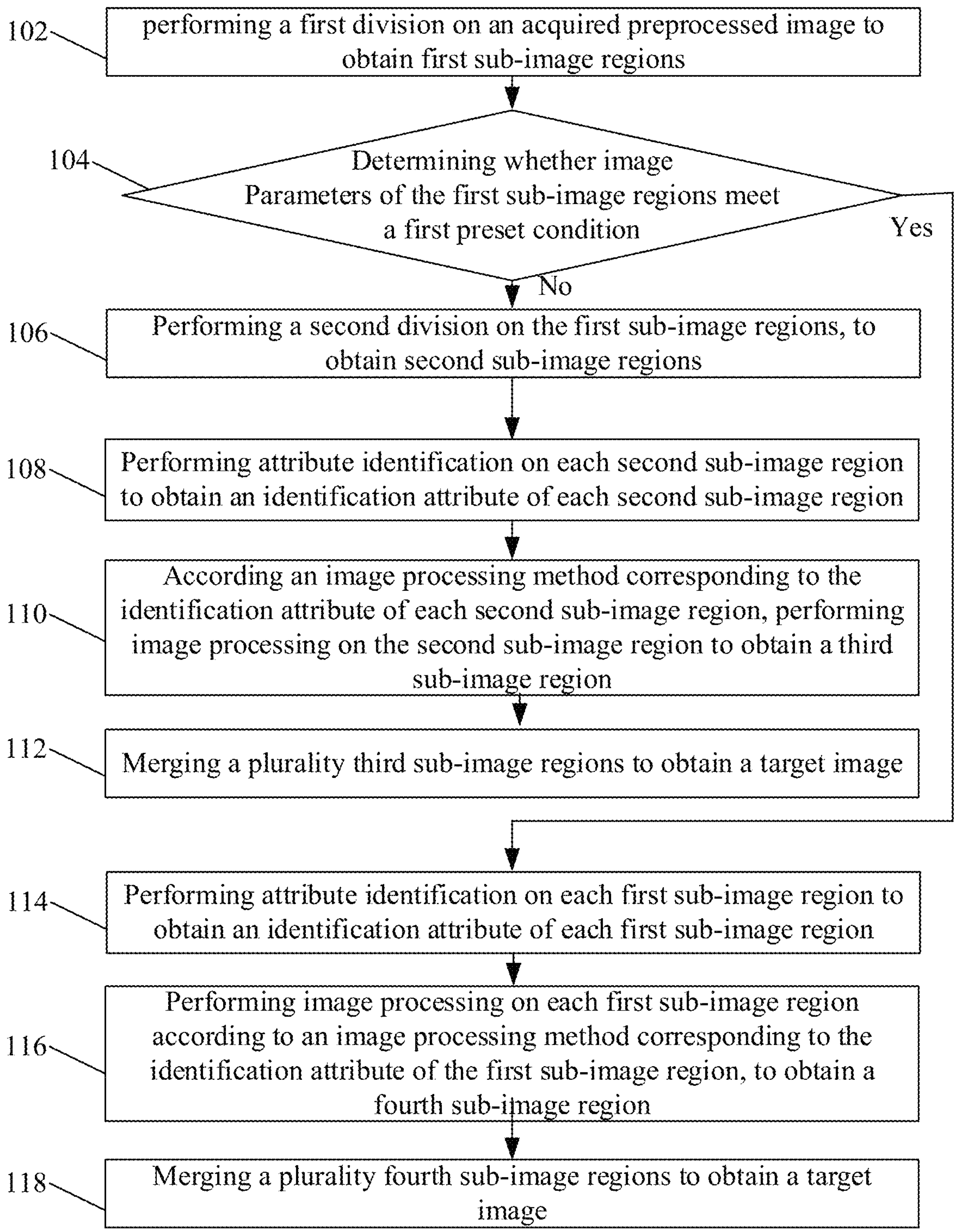
FIG. 1A illustrates a flowchart of an exemplary image processing method according to various disclosed embodiments of the present disclosure.

The present disclosure provides an image processing method. As shown in FIG. 1A which illustrates a flow chart of an exemplary image processing method, in one embodiment, the method may include: S102 to S118.

In S102: a first division may be performed on an acquired preprocessed image to obtain a plurality of first sub-image regions.

In one embodiment, before S102, the method may further include acquiring the preprocessed image.

In one embodiment, the preprocessed image may be a source image. That is, after the source image is acquired, the source image may be directly used as the preprocessed image, and the first division may be performed on the preprocessed image. The preprocessed image may be the whole image or a partial image of a large-format image. For example, when the entire large-format image is scanned, the entire image is obtained. When a portion of the large-format image is scanned, a partial image is obtained. For example, the large-format image may be an A4 format image. The image content of the preprocessed image may include at least one of: image, text, or background.

Figure 1B:
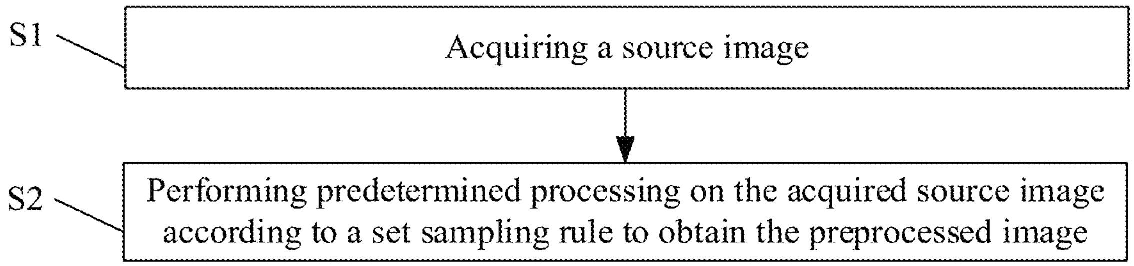
FIG. 1B illustrates a flowchart of obtaining a preprocessed image according to various disclosed embodiments of the present disclosure.

In one embodiment shown in FIG. 1B which is a flow chart of obtaining a preprocessed image, obtaining the preprocessed image may specifically include:

S1: obtaining the source image, where the source image may be obtained by scanning the large format image; and S2, performing predetermined processing on the acquired source image according to a configured sampling rule to obtain the preprocessed image.

The sampling rule may be set for the acquired source image, and the source image may be preprocessed according to the sampling rule to reduce the amount of image data. For example, the sampling rule may include sampling resolution and/or image color mode, where the image color mode may include color, grayscale or binarization.

In one embodiment, the sampling rule may include the sampling resolution. Correspondingly, S2 may include: setting the current resolution of the source image to be the sampling resolution according to the set sampling resolution to obtain the preprocessed image. The current resolution of the preprocessed image may be the sampling resolution which is smaller than the current resolution of the source image. For example, the sampling resolution may be 600 dpi or 200 dpi. Therefore, the resolution of the image after predetermined processing may be reduced, to reduce the amount of image data.

In another embodiment, the sampling rule may include the image color mode. Correspondingly, S2 may include: performing image color processing on the source image according to the set image color mode to obtain the preprocessed image. The source image may be a color image. For example, grayscale processing may be performed on the source image to obtain the preprocessed image, and the preprocessed image may be a grayscale image. For another example, binary processing may be performed on the source image to obtain the preprocessed image, and the preprocessed image may be a binary image. Converting the source image to a grayscale image or a binary image may reduce the number of colors in the image, therefore achieving the purpose of reducing the amount of image data.

In another embodiment, the sampling rule includes sampling resolution and image color mode. Correspondingly, S2 may include: setting the current resolution of the source image to be the sampling resolution according to the set sampling resolution and performing image color processing on the source image according to the set image color mode, to obtain the preprocessed image. The resolution of the image after predetermined processing and the number of colors in the image may be reduced, to reduce the amount of image data.

In S1 and S2, the obtained preprocessed image may be not the original image data, but the image data obtained after predetermined processing. Compared with the situation where the obtained preprocessed image is the original image data, the data amount of the image may be reduced while retaining the characteristics of the original image data, therefore reducing consumption of and dependence on system resources during subsequent image processing.

In one embodiment, S102 may include: according to a set size of the first division area, performing the first division on the preprocessed image to obtain a plurality of first sub-image areas. The size of the first division area may be set according to actual needs.

When the image format of the preprocessed image to be processed is large, the preprocessed image may be divided into a plurality of sub-image areas, and the divided plurality of sub-image areas may be processed separately, to improve the image processing effect.

In S104, it may be determined whether image parameters of the plurality of first sub-image areas satisfy a first preset condition. When the image parameters of the plurality of first sub-image areas do not satisfy the first preset condition, S106 may be executed. When the image parameters of the plurality of first sub-image areas satisfy the first preset condition, S114 may be executed.

In one embodiment, the first preset condition may include that the absolute values of the differences between the image parameters and the set target parameters are all smaller than the set threshold. Correspondingly, S104 may include determining whether the absolute values of the differences between the image parameters of the plurality of first sub-image regions and the target parameters are all smaller than the set threshold. When it is determined that at least one of the absolute values of the differences between the image parameters of the plurality of first sub-image regions and the target parameters is larger than or equal to the set threshold, the image parameters of the plurality of first sub-image areas may not meet the first preset condition and it may be necessary to divide the plurality of first sub-image areas again, and S106 may be executed subsequently. When it is determined that the absolute values of the differences between the image parameters of the plurality of first sub-image areas and the target parameters are all smaller than the set threshold, the image parameters of the plurality of first sub-image areas may be determined to satisfy the first preset condition, and there may be no need to divide the plurality of first sub-image areas again, such that S114 may be executed.

The image parameters may include at least one of recognition accuracy, blurring degree, signal-to-noise ratio, or a number of noise points.

For example, in one embodiment, the image parameters may include the recognition accuracy, the target parameters may include the target accuracy, and the set threshold may include the accuracy threshold. Therefore, S104 may include: determining whether the absolute values of the difference between the recognition accuracy of the plurality of first sub-image regions and the target accuracy are all smaller than the accuracy threshold. When at least one of the absolute values of the difference between the recognition accuracy of the plurality of first sub-image regions and the target accuracy is larger than or equal to the accuracy threshold, it may be determined that the recognition accuracy of the plurality of first sub-image regions is poor and does not meet the first preset condition, therefore it may be necessary to divide the plurality of first sub-image areas again and continue to execute S106 to improve the recognition accuracy of the plurality of first sub-image areas. When the absolute values of the difference between the recognition accuracy of the plurality of first sub-image regions and the target accuracy are all smaller than the accuracy threshold, it may be determined that the recognition accuracy of the plurality of first sub-image regions meet the first preset condition, therefore it may be unnecessary to divide the plurality of first sub-image areas again and continue to execute S104. For example, the recognition accuracy may be 70%, the target accuracy may be 90%, and the accuracy threshold may be 15%.

In another embodiment, the image parameters may include the signal-to-noise ratio, the target parameters may include the target signal-to-noise ratio, and the set threshold may include the signal-to-noise ratio threshold. Therefore, S104 may include: determining whether the absolute values of the difference between the signal-to-noise ratio of the plurality of first sub-image regions and the target signal-to-noise ratio are all smaller than the signal-to-noise ratio threshold. When at least one of the absolute values of the difference between the signal-to-noise ratio of the plurality of first sub-image regions and the target signal-to-noise ratio is larger than or equal to the signal-to-noise ratio threshold, it may be determined that the signal-to-noise ratio of the plurality of first sub-image regions is poor, and the image have too many noise points and blurry. The signal-to-noise ratio of the plurality of first sub-image regions does not meet the first preset condition, therefore it may be necessary to divide the plurality of first sub-image areas again and continue to execute S106. When the absolute values of the difference between the signal-to-noise ratio of the plurality of first sub-image regions and the target signal-to-noise ratio are all smaller than the signal-to-noise ratio threshold, it may be determined that the signal-to-noise ratio of the plurality of first sub-image regions is good and meet the first preset condition, therefore it may be unnecessary to divide the plurality of first sub-image areas again and continue to execute S114.

In S106, second division may be performed on the plurality of first sub-image regions, to obtain a plurality of second sub-image regions.

In one embodiment, for S106, according to a set size of the second divided region, the second division may be performed on the plurality of first sub-image areas to obtain the plurality of second sub-image areas. The size of the second divided area may be set according to actual needs. When the image parameters of the plurality of first sub-image areas do not meet the first preset condition, the plurality of first sub-image areas may be divided again to obtain a plurality of smaller areas. Therefore, the recognition accuracy of the plurality of divided second sub-image areas is higher, or dividing the plurality of first sub-image areas again may reduce the blurring degree of sub-image areas and improve the clarity of the sub-image area, which may be beneficial to identify the target image and improve the image processing effect.

In S108, attribute identification may be performed on each second sub-image area of the plurality of second sub-image regions, to obtain the identification attribute of the second sub-image area.

In one embodiment, for S108, according to the image content of the second sub-image region, the identification attribute of the second sub-image region may be determined to be the first attribute or the second attribute. In one embodiment, the image content may include at least one of images, texts, or background. For example, when the image content of the second sub-image region includes images and/or texts, the identification attribute of the second sub-image region may be identified as the first attribute. For another example, when the image content of the second sub-image region includes the background, the identification attribute of the second sub-image region may be identified as the second attribute.

Different second sub-image regions of the plurality of second sub-image regions may have the same identification attribute or different identification attributes. In one embodiment, the identification attributes may include the first attribute or the second attribute, and the image processing manners of the second sub-image regions with different identification attributes may be different. One second sub-image region of the plurality of second sub-image regions with the first attribute may be an image region that requires special processing, and one of the plurality of second sub-image regions with the second attribute may be an image region that requires ordinary processing.

In S110, image processing may be performed on each second sub-image region of the plurality of second sub-image regions according to an image processing method corresponding to the identification attribute of the second sub-image region, to obtain a third sub-image region.

In one embodiment, the image processing method corresponding to the first attribute may be a first image processing method, and the image processing method corresponding to the second attribute may be a second image processing method. Therefore, S110 may include: for one second sub-image region whose identification attribute is the first attribute, performing image processing according to the first image processing method to obtain one corresponding third sub-image region; and for one second sub-image region whose identification attribute is the second attribute region, performing image processing according to the second image processing method to obtain one corresponding third sub-image region.

In one embodiment, the first image processing method may include at least one of thickening, color enhancement, or sharpening.

In one embodiment, the second image processing method may include shading adjustment and/or color adjustment.

In S112, a plurality of third sub-image regions may be merged to obtain a target image, and the process may end.

In the present disclosure, in the preprocessed image, each sub-image region may have position index information, and the position index information may be used to indicate the position of the sub-image region in the preprocessed image. Therefore, S112 may include: merging the plurality of third sub-image regions according to the position index information of each third sub-image region to obtain the target image.

In S114, attribute identification may be performed on each first sub-image region of the plurality of first sub-image regions, to obtain the identification attribute of the first sub-image region.

In one embodiment, for S114, according to the image content of the first sub-image region, the identification attribute of the first sub-image region may be determined to be the first attribute or the first attribute. In one embodiment, the image content may include at least one of images, texts, or background. For example, when the image content of the first sub-image region includes images and/or texts, the identification attribute of the first sub-image region may be identified as the first attribute. For another example, when the image content of the first sub-image region includes the background, the identification attribute of the first sub-image region may be identified as the first attribute.

Different first sub-image regions of the plurality of first sub-image regions may have the same identification attribute or different identification attributes. In one embodiment, the identification attributes may include the first attribute or the first attribute, and the image processing manners of the first sub-image regions with different identification attributes may be different. One first sub-image region of the plurality of first sub-image regions with the first attribute may be an image region that requires special processing, and one of the plurality of first sub-image regions with the first attribute may be an image region that requires ordinary processing.

In S116, image processing may be performed on each first sub-image region of the plurality of first sub-image regions according to an image processing method corresponding to the identification attribute of the first sub-image region, to obtain a fourth sub-image region.

In one embodiment, the image processing method corresponding to the first attribute may be a first image processing method, and the image processing method corresponding to the first attribute may be a first image processing method. Therefore, S116 may include: for one first sub-image region whose identification attribute is the first attribute, performing image processing according to the first image processing method to obtain one corresponding fourth sub-image region; and for one first sub-image region whose identification attribute is the first attribute region, performing image processing according to the first image processing method to obtain one corresponding fourth sub-image region.

In one embodiment, the first image processing method may include at least one of thickening, color enhancement, or sharpening.

In one embodiment, the first image processing method may include shading adjustment and/or color adjustment.

In S118, a plurality of fourth sub-image regions may be merged to obtain a target image, and the process may end.

In the present disclosure, in the preprocessed image, each sub-image region may have position index information, and the position index information may be used to indicate the position of the sub-image region in the preprocessed image. Therefore, S118 may include: merging the plurality of fourth sub-image regions according to the position index information of each fourth sub-image region to obtain the target image.

In the present disclosure, when it is determined that the image parameters of the plurality of first sub-image regions obtained by division do not meet the first preset condition, the second division may be performed on the plurality of first sub-image regions again to obtain the plurality of second sub-image regions. Then, according to the image processing method corresponding to the identification attribute of each second sub-image region, image processing may be performed on the second sub-image region to obtain one corresponding third sub-image region. The obtained plurality of third sub-image regions may be merged to obtain the target image. Different image processing methods may be performed for regions with different identification attributes, and parallel processing of regions with different identification attributes may be realized, thereby improving image processing efficiency and effects and solving the problem of excessive system resource occupation.

Figure 2:
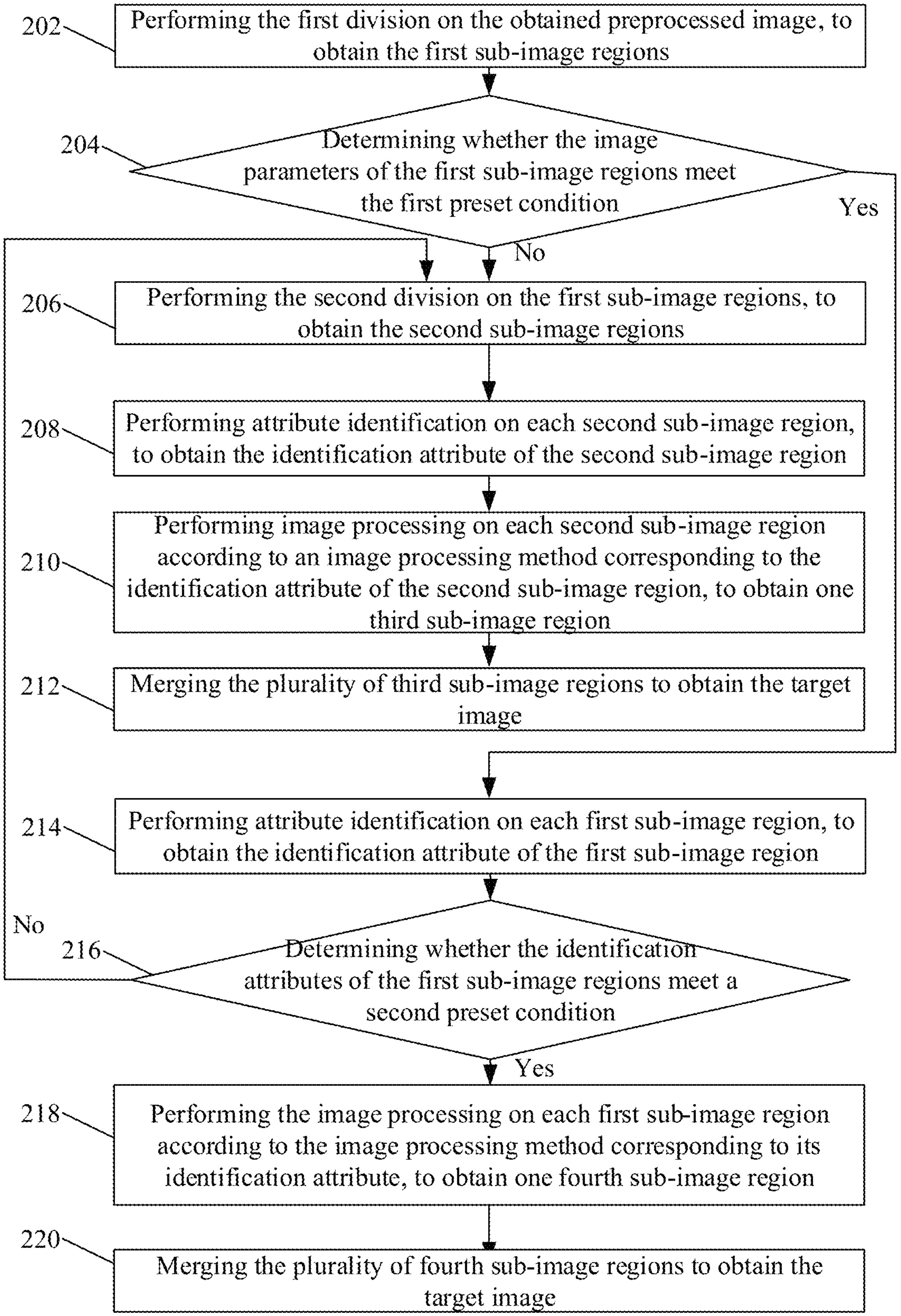
FIG. 2 illustrates a flowchart of another exemplary image processing method according to various disclosed embodiments of the present disclosure.

Another embodiment of the present disclosure provides another image processing method. As shown in FIG. 2, the exemplary method may include the following.

S202: performing the first division on the obtained preprocessed image, to obtain the plurality of first sub-image regions.

S204: determining whether the image parameters of the plurality of first sub-image regions obtained by division meet the first preset condition, executing S206 when the image parameters of the plurality of first sub-image regions obtained by division do not meet the first preset condition, and executing S214 when the image parameters of the plurality of first sub-image regions obtained by division meet the first preset condition.

S206: performing the second division on the plurality of first sub-image regions, to obtain the plurality of second sub-image regions.

S208: performing the attribute identification on each second sub-image region of the plurality of second sub-image regions, to obtain the identification attribute of the second sub-image region.

S210: performing image processing on each second sub-image region of the plurality of second sub-image regions according to an image processing method corresponding to the identification attribute of the second sub-image region, to obtain one third sub-image region.

S212: merging the plurality of third sub-image regions to obtain the target image, where the process may end.

S214: performing the attribute identification on each first sub-image region of the plurality of first sub-image regions, to obtain the identification attribute of the first sub-image region.

For the description of S202 to S214 in this embodiment, reference may be made to the description of S102 to S114 above and the description will not be repeated herein.

S216: determining whether the identification attributes of the plurality of first sub-image regions meet a second preset condition, executing S206 when the identification attributes of the plurality of first sub-image regions obtained by division do not meet the second preset condition, and executing S218 when the image parameters of the plurality of first sub-image regions obtained by division meet the first preset condition.

S218: performing the image processing on each first sub-image region of the plurality of first sub-image regions according to the image processing method corresponding to the identification attribute of the first sub-image region, to obtain one fourth sub-image region.

S220: merging the plurality of fourth sub-image regions to obtain the target image, where the process may end.

For the description of S218 to S220 in this embodiment, reference may be made to the description of S116 to S118 above and the description will not be repeated herein.

In the present embodiment, the second preset condition may include whether the identification attribute is a preset attribute. S216 may specifically include: determining whether the identification attributes of the plurality of first sub-image regions are all the preset attributes. When it is determined that the identification attributes of the plurality of first sub-image regions are all the preset attributes, the identification attributes of the plurality of first sub-image regions meet the second preset condition, and there may be no need to divide the plurality of first sub-image regions again, therefore executing S218. When it is determined that at least one of the identification attributes of the plurality of first sub-image regions is not the preset attribute, at least one of the identification attributes of the plurality of first sub-image regions does not meet the second preset condition, and it may be necessary to divide the plurality of first sub-image regions again, therefore executing S206.

In this embodiment, the preset attribute may include a first attribute or a second attribute. When the identification attribute of one first sub-image region is the first attribute, it may be determined that the identification attribute of the first sub-image region is the preset attribute. When the identification attribute of one first sub-image region is the second attribute, it may be determined that the identification attribute of the first sub-image region is a preset attribute. When the identification attribute of one first sub-image region includes the first attribute and the second attribute, since the preset attribute is the first attribute or the second attribute, at this time, the identification attribute may be not completely the preset attribute. Therefore, it may be determined that the identification attribute of the first sub-image region is not the preset attribute.

For example, when the image content of the first sub-image region includes text, the identification attribute of the identified first sub-image region may be the first attribute, indicating that the image content of the first sub-image region is text, and the first attribute of the first sub-image region may be determined to be the preset attribute. When the image content of the first sub-image region is the background, the identification attribute of the identified first sub-image region may be the second attribute indicating that the image content of the first sub-image region is the background, and it may be determined that the second attribute of the first sub-image region is the preset attribute. When the image content of the first sub-image region includes text and background, the identification attribute of the identified first sub-image region may include the first attribute and the second attribute indicating that the image content of the first sub-image region includes text and background, and it may be determined that the identification attribute of the first sub-image region is not completely the first attribute, nor is it completely the second attribute. Therefore, it may be determined that the identification attribute of the first sub-image region is not the preset attribute.

In the present embodiment, whether the plurality of first sub-image regions is to be divided again may be determined by determining whether the identification attributes of the plurality of first sub-image regions meet the second preset condition. The image processing efficiency and effect may be improved further.

Figure 3A:
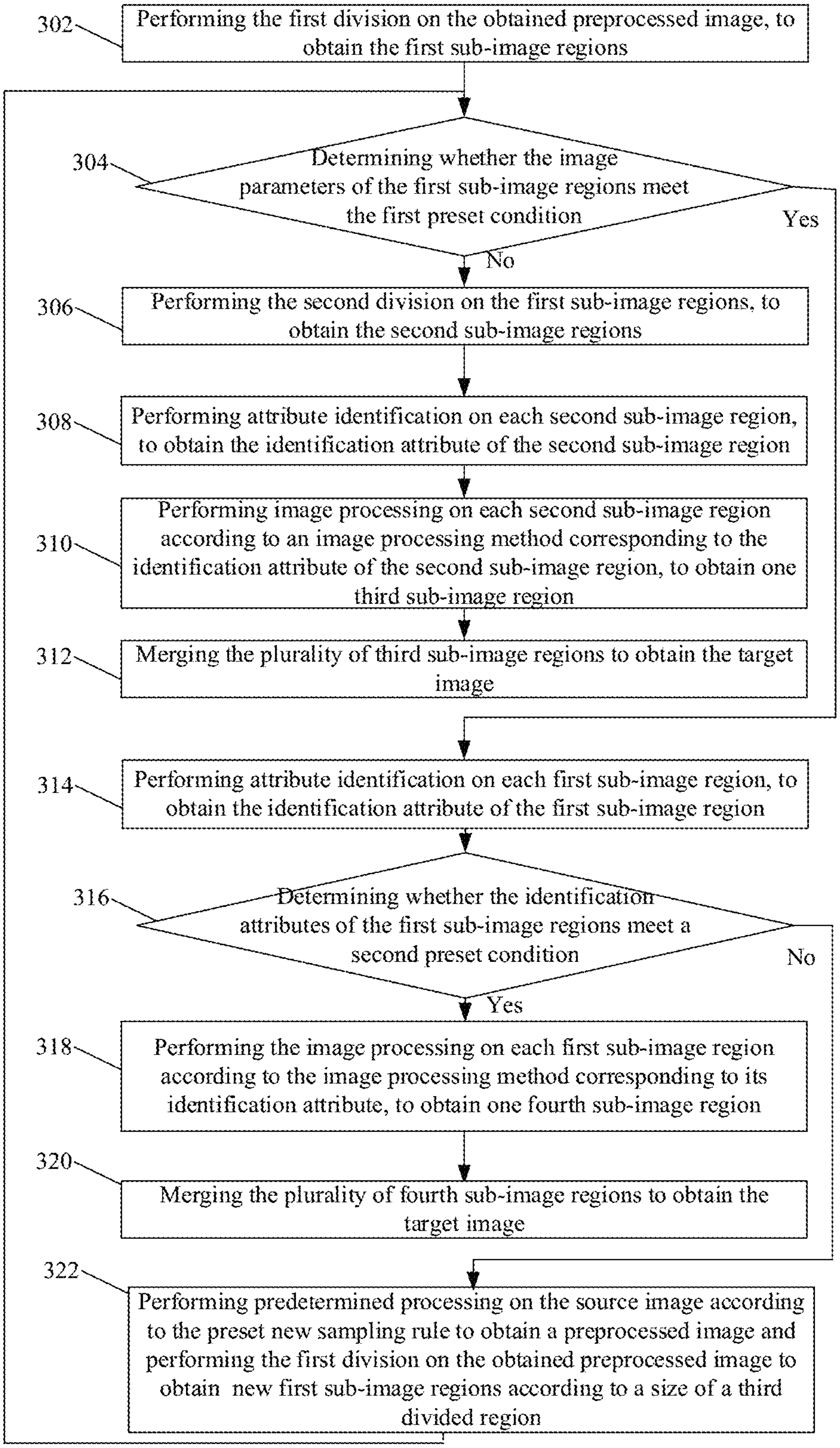
FIG. 3A illustrates a flowchart of another exemplary image processing method according to various disclosed embodiments of the present disclosure.

Another embodiment of the present disclosure provides another image processing method. As shown in FIG. 3, the method may include:

S302: performing the first division on the obtained preprocessed image according to a preset size of the first division region, to obtain the plurality of first sub-image regions.

S304: determining whether the image parameters of the plurality of first sub-image regions obtained by division meet the first preset condition, executing S306 when the image parameters of the plurality of first sub-image regions obtained by division do not meet the first preset condition, and executing S314 when the image parameters of the plurality of first sub-image regions obtained by division meet the first preset condition.

S306: performing the second division on the plurality of first sub-image regions according to a preset size of the second division region, to obtain the plurality of second sub-image regions.

S308: performing the attribute identification on each second sub-image region of the plurality of second sub-image regions, to obtain the identification attribute of the second sub-image region.

S310: performing image processing on each second sub-image region of the plurality of second sub-image regions according to an image processing method corresponding to the identification attribute of the second sub-image region, to obtain one third sub-image region.

S312: merging the plurality of third sub-image regions may be merged to obtain the target image, where the process may end.

S314: performing the attribute identification on each first sub-image region of the plurality of first sub-image regions, to obtain the identification attribute of the first sub-image region.

S316: determining whether the identification attributes of the plurality of first sub-image regions meet a second preset condition, executing S322 when the identification attributes of the plurality of first sub-image regions obtained by division do not meet the second preset condition, and executing S318 when the image parameters of the plurality of first sub-image regions obtained by division meet the second preset condition.

S318: performing the image processing on each first sub-image region of the plurality of first sub-image regions according to the image processing method corresponding to the identification attribute of the first sub-image region, to obtain one fourth sub-image region.

S320: merging the plurality of fourth sub-image regions to obtain the target image, where the process may end.

S322: performing predetermined processing on the acquired source image according to a preset new sampling rule to obtain a preprocessed image, performing the first division on the acquired preprocessed image according to a preset size of a third divided region to obtain a plurality of first sub-image regions, and executing S304.

In the present embodiment, in S316, when it is determined that the identification attributes of the plurality of first sub-image regions do not satisfy the second preset condition, the preprocessed image may need to be re-divided. The new sampling rule may be configured first. For example, the new sampling rule may include a new sampling resolution and/or a new image color mode. Then, the preset processing may be performed on the acquired source image according to the new sampling rule to obtain the preprocessed image, therefore achieving performing preset processing on the source image again by changing the sampling rule. Subsequently, the size of the third division region may be configured. The size of the third division region may be different from the size of the first division region. For example, the size of the third division region may be smaller than the size of the first division region. The first division may be performed on the acquired preprocessed image according to the size of the third division region to obtain the plurality of first sub-image regions, achieving re-dividing the preprocessed image by changing the size of the division region.

Figure 3B:
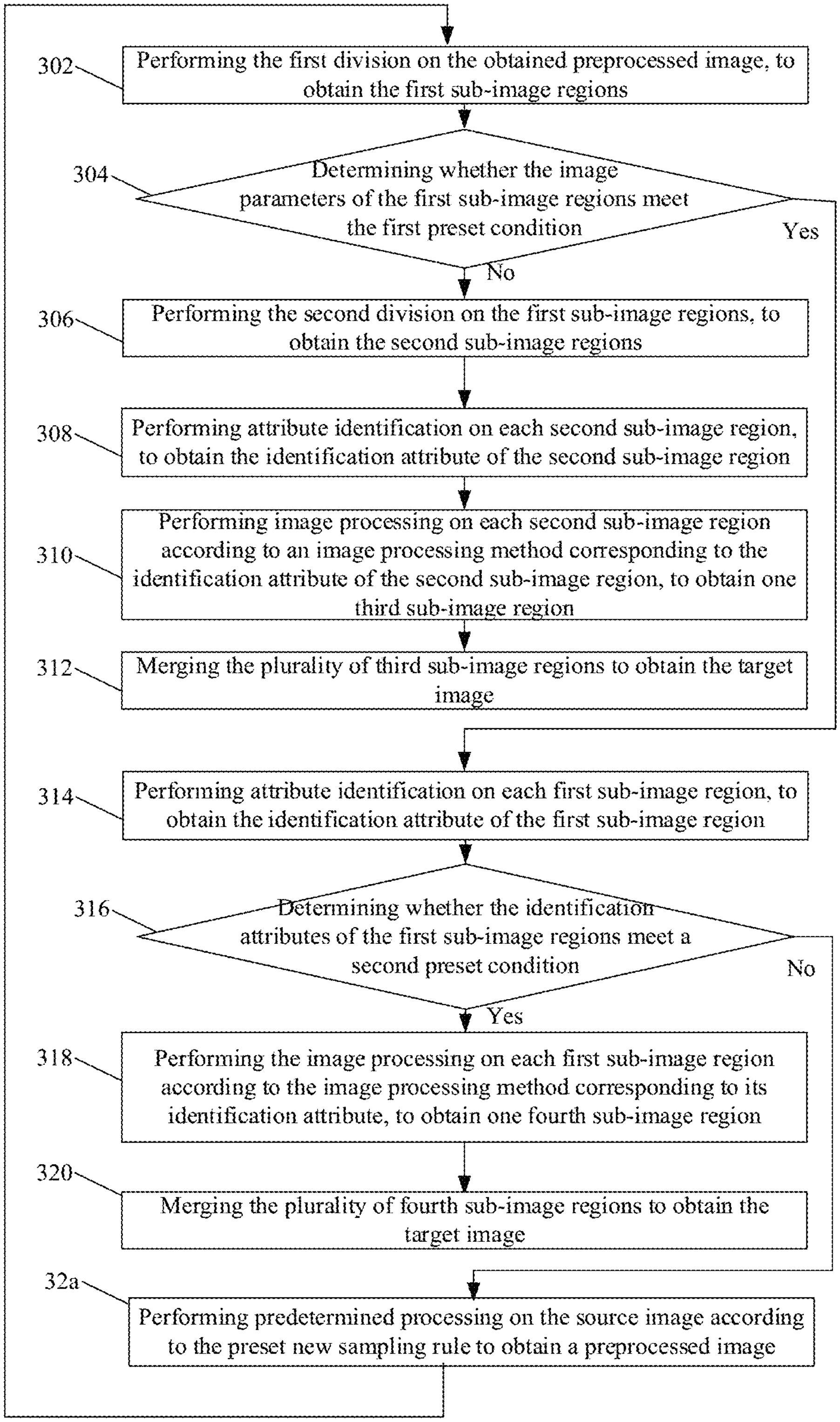
FIG. 3B illustrates a flowchart of another exemplary image processing method according to various disclosed embodiments of the present disclosure.

In another embodiment shown in FIG. 3B, in S316, when it is determined that at least one of the identification attributes of the plurality of first sub-image regions does not meet the second preset condition, S32*a* may be executed.

In S32*a*, predetermined processing may be performed on the acquired source image according to the preset new sampling rule to obtain the preprocessed image, and then S302 may be executed.

In the present embodiment, in S316, when it is determined that the identification attributes of the plurality of first sub-image regions do not satisfy the second preset condition, the preprocessed image may need to be re-divided. The new sampling rule may be configured first. For example, the new sampling rule may include a new sampling resolution and/or a new image color mode. Then, the preset processing may be performed on the acquired source image according to the new sampling rule to obtain the preprocessed image, therefore achieving performing preset processing on the source image again by changing the sampling rule. Subsequently, S302 may be executed.

Figure 3C:
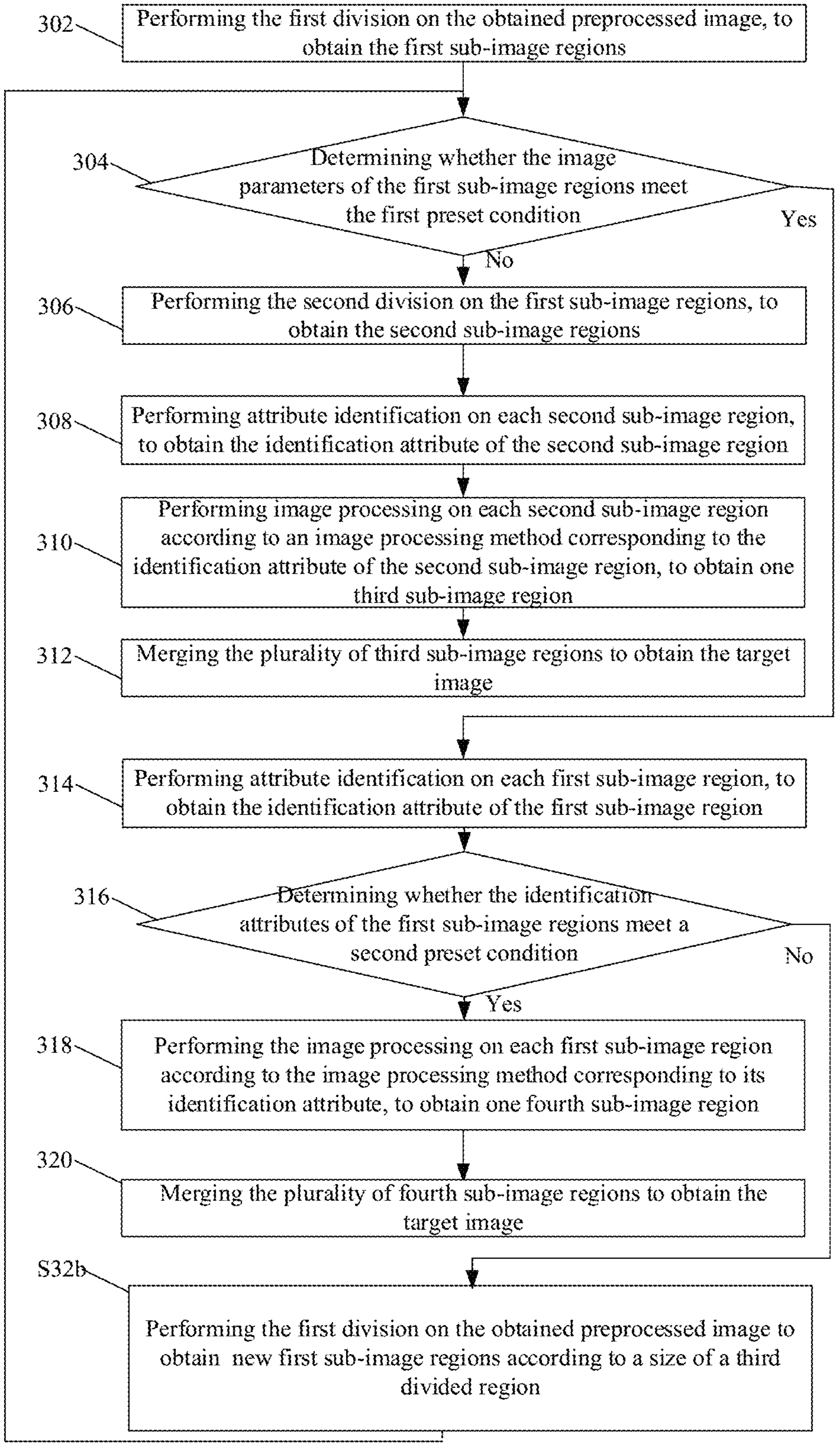
FIG. 3C illustrates a flowchart of another exemplary image processing method according to various disclosed embodiments of the present disclosure.

In another embodiment shown in FIG. 3C, in S316, when it is determined that at least one of the identification attributes of the plurality of first sub-image regions does not meet the second preset condition, S32*b* may be executed.

In S32*b*, the first division may be performed on the acquired preprocessed image according to the preset size of the third divided region to obtain the plurality of first sub-image regions, and then S304 may be executed.

In the present embodiment, in S316, when it is determined that the identification attributes of the plurality of first sub-image regions do not satisfy the second preset condition, the preprocessed image may need to be re-divided. The size of the third division region may be configured. The size of the third division region may be different from the size of the first division region. For example, the size of the third division region may be smaller than the size of the first division region. The first division may be performed on the acquired preprocessed image according to the size of the third division region to obtain the plurality of first sub-image regions, achieving re-dividing the preprocessed image by changing the size of the division region.

In the present disclosure, by determining whether the identification attributes of the plurality of first sub-image regions satisfy the second preset condition, it may be determined whether to re-perform predetermined processing on the source image or whether to re-divide the pre-processed image, thereby further improving image processing efficiency and image processing effect.

Figures 4A, 4B, 4C, 4D, 4E, 4F:
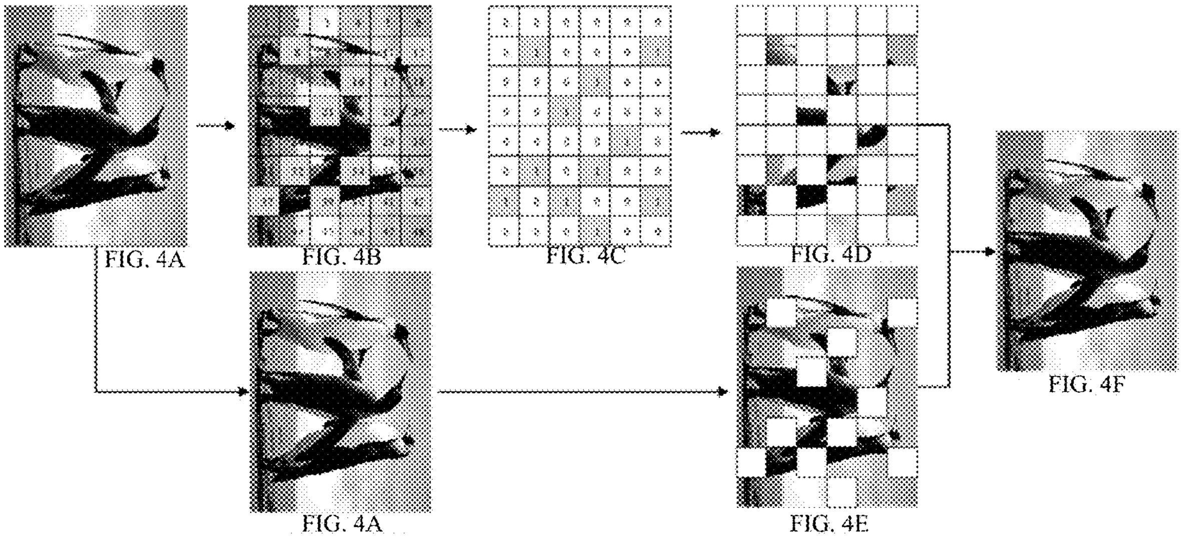
FIG. 4A to FIG. 4F illustrates schematic diagrams of an exemplary image processing method according to various disclosed embodiments of the present disclosure.

FIG. 4A to FIG. 4F are schematic diagrams of an image processing method provided by one embodiment of the present disclosure. The image processing method provided will be described in detail below with reference to FIG. 4A to FIG. 4F through a specific example. FIG. 4A shows a preprocessed image. The preprocessed image may be an image of the entire paper, a partial image, or an image whose size is determined according to the size of the actual image obtained. For example, the image obtained may be the entire paper format such as the entire image of A4 format size, or be a partial image obtained, which may be determined according to actual needs. The preprocessed image may be obtained through computer distribution, scanning or other conventional methods. When the preprocessed image is obtained by scanning, the size of the preprocessed image may be determined according to whether the scanned document is partial or complete. When the scanned document is a partial image, the partial image may be divided. When the scanned document is a complete image of the entire paper format, the entire image may be divided (that is, when it contains text, the text also needs to be divided).

As shown in FIG. 4B, after performing S102 to S106 on the preprocessed image shown in FIG. 4A, 48 second sub-image regions may be obtained. Attribute identification may be performed on the 48 second sub-image regions to obtain the identification attribute of each second sub-image region. As shown in FIG. 4C, when one second sub-image region includes a penguin image, the identification attribute of the second sub-image region may be determined to be the first attribute, and the first attribute may be represented by a number 1. That is, the first attribute may be 1. For example, the identification attribute of the 8th second sub-image region and the identification attribute of the 12th second sub-image region may both be 1. When one second sub-image region includes a background image, it may be determined that the identification attribute of the second sub-image region is the second attribute, and the second attribute may be represented by a number 0. That is, the second attribute may be 0. For example, the identification attributes of the first to the sixth second sub-image regions may be all 0. As shown in FIG. 4D, for the second sub-image regions (the white regions in FIG. 4D) whose identification attributes are 1, image processing may be performed according to the first image processing method to obtain the third sub-image regions. The identification attribute of one second sub-image region may be set as required. For example, a certain part of the penguin image may be determined as the second sub-image regions and the identification attribute of the certain part of the penguin image may be determined as the first attribute. A certain part of the background image may be determined as the second sub-image region and the identification attribute of the certain part of the background image may be determined as the second attribute. Also, the identification attributes of several sub-regions at specific positions in the second sub-image regions may be specified and corresponding image processing may be performed. This is not limited in the present disclosure. As shown in FIG. 4E, for the second sub-image regions (the white region in FIG. 4E) whose identification attributes are 2, image processing may be performed according to the second image processing method to obtain the third sub-image regions. As shown in FIG. 4F, the target image may be obtained by merging the third sub-image regions in FIG. 4D and the third sub-image region in FIG. 4E. Therefore, the image processing efficiency and the image processing effect may be improved.

Figure 5:
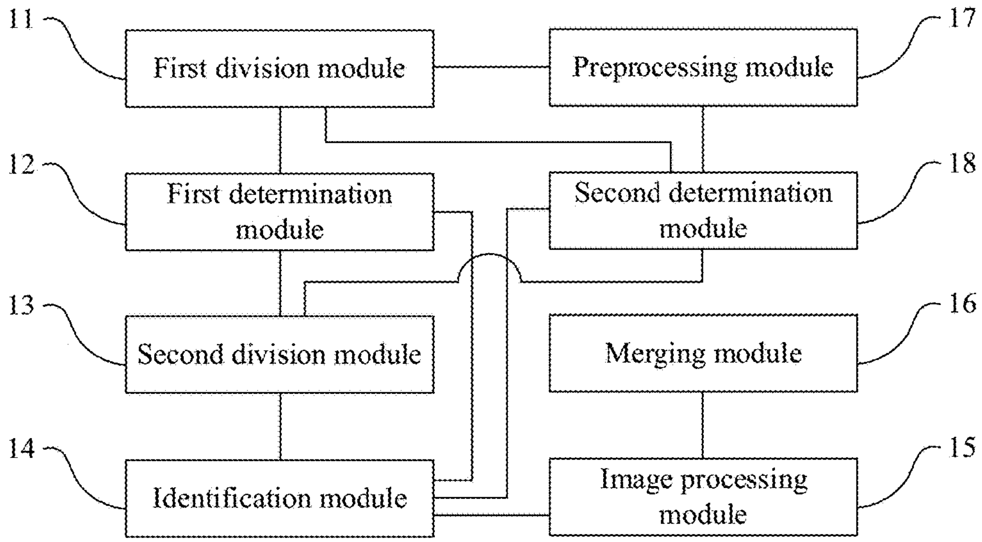
FIG. 5 illustrates an exemplary image processing device according to various disclosed embodiments of the present disclosure.

The present disclosure provides an image processing device. FIG. 5 illustrating a structural diagram of an image processing device provided by one embodiment. As shown in FIG. 5, in one embodiment, the image processing device may include a first division module 11, a first determination module 12, a second division module 13, an identification module 14, an image processing module 15, and a merging module 16.

The first division module 11 may be configured to perform first division on an acquired preprocessed image to obtain a plurality of first sub-image regions. The first determination module 12 may be configured to determine whether image parameters of the plurality of first sub-image regions satisfy a first preset condition. The second division module 13 may be configured to perform second division on the plurality of first sub-image regions when the first determination module 12 determines that the image parameters of the plurality of first sub-image regions do not satisfy the first preset condition, to obtain a plurality of second sub-image regions. The identification module 14 may be configured to perform attribute identification on each of the plurality of second sub-image regions to obtain the identification attribute of each of the plurality of second sub-image regions. The image processing module 15 may be configured to perform image processing on each of the plurality of second sub-image regions to obtain a third sub-image region according to the image processing method corresponding to the identification attribute of each second sub-image region. The merging module 16 may be configured to merge a plurality of the third sub-image regions to obtain a target image.

In one embodiment, the first division module 11 may be configured to perform the first division on the acquired preprocessed image according to a size of a first division region, to obtain the plurality of first sub-image regions.

In one embodiment, the second division module 13 may be configured to perform the second division on the plurality of first sub-image regions according to a size of a second division region, to obtain the plurality of second sub-image regions.

In one embodiment, the identification module 14 may be configured to determine whether the identification attribute of each second sub-image region is the first attribute or the second attribute. In one embodiment, the image processing method corresponding to the first attribute may be a first image processing method, and the image processing method corresponding to the second attribute may be a second image processing method.

In one embodiment, the device may further include a preprocessing module 17 configured to perform predetermined processing on the acquired source image according to a preset sampling rule to obtain the preprocessed image.

In one embodiment, the device may further include a second determination module 18.

In one embodiment, the identification module 14 may be further configured to: perform attribute identification on each first sub-image region of the plurality of first sub-image regions, to obtain the identification attribute of the first sub-image region, when the image parameters of the plurality of first sub-image regions do not satisfy the first preset condition. The second determination module 18 may be configured to: determine whether the identification attributes of the plurality of first sub-image regions meet a second preset condition. The second division module 13 may be triggered to perform the second division on the plurality of first sub-image regions to obtain the plurality of second sub-image regions, when the identification attributes of the plurality of first sub-image regions obtained by division do not meet the second preset condition.

In another embodiment, the identification module 14 may be further configured to: perform attribute identification on each first sub-image region of the plurality of first sub-image regions, to obtain the identification attribute of the first sub-image region, when the image parameters of the plurality of first sub-image regions do not satisfy the first preset condition. The second determination module 18 may be configured to: determine whether the identification attributes of the plurality of first sub-image regions meet a second preset condition. The preprocessing module 17 may be configured to perform a preset processing on the acquired source image according to a preset new sampling rule to obtain the preprocessed image and trigger the first division module to perform the first division on the obtained preprocessed image to obtain the plurality of first sub-image regions, when the second determination module 18 determined that the identification attributes of the plurality of first sub-image regions obtained by division do not meet the second preset condition.

In another embodiment, the identification module 14 may be further configured to: perform attribute identification on each first sub-image region of the plurality of first sub-image regions, to obtain the identification attribute of the first sub-image region, when the first determination module 12 determined that the image parameters of the plurality of first sub-image regions satisfy the first preset condition. The second determination module 18 may be configured to: determine whether the identification attributes of the plurality of first sub-image regions meet a second preset condition. The first division module 11 may be triggered to perform the first division on the obtained preprocessed image to obtain the plurality of first sub-image region according to a size of a third division region, when the second determination module 18 determined that the identification attributes of the plurality of first sub-image regions obtained by division do not meet the second preset condition.

In another embodiment, the identification module 14 may be further configured to: perform attribute identification on each first sub-image region of the plurality of first sub-image regions, to obtain the identification attribute of the first sub-image region, when the first determination module 12 determined that the image parameters of the plurality of first sub-image regions satisfy the first preset condition. The second determination module 18 may be configured to: determine whether the identification attributes of the plurality of first sub-image regions meet a second preset condition. The preprocessing module 17 may be configured to perform a preset processing on the acquired source image according to a preset new sampling rule to obtain the preprocessed image and the first division module 11 may be triggered to perform the first division on the obtained preprocessed image to obtain the plurality of first sub-image region according to a size of a third division region, when the second determination module 18 determined that the identification attributes of the plurality of first sub-image regions obtained by division do not meet the second preset condition.

The image processing device may be applied to an image forming device or an electronic device.

In the image processing device provided by the present disclosure, when it is determined that the image parameters of the plurality of first sub-image regions obtained by division do not meet the first preset condition, the second division may be performed on the plurality of first sub-image regions again to obtain the plurality of second sub-image regions. Then, according to the image processing method corresponding to the identification attribute of each second sub-image region, image processing may be performed on the second sub-image region to obtain one corresponding third sub-image region. The obtained plurality of third sub-image regions may be merged to obtain the target image. Different image processing methods may be performed for regions with different identification attributes, and parallel processing of regions with different identification attributes may be realized, thereby improving image processing efficiency and effects and solving the problem of excessive system resource occupation.

The present disclosure also provides a computer-readable storage medium. The computer-readable storage medium may be configured to store a program. When the program is executed, a device where the storage medium is located may be controlled to execute the image processing method provided by various embodiments of the present disclosure.

The present disclosure also provides an image forming device. The image forming device may include one or more processors, a memory, and one or more computer programs. The one or more computer programs may be stored in the memory, and may include instructions. When the instructions are executed by the image forming device, the image forming device may be controlled to execute the image processing method provided by various embodiments of the present disclosure.

Figure 6:
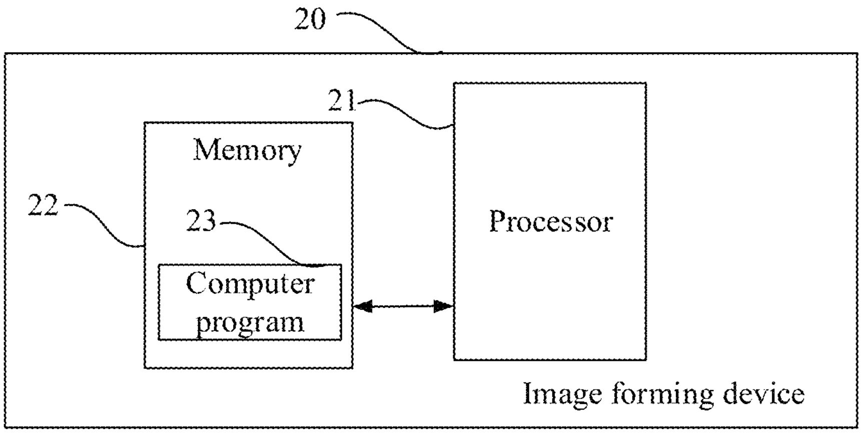
FIG. 6 illustrates an exemplary image forming device according to various disclosed embodiments of the present disclosure.

In another embodiment shown in FIG. 6, the image forming device 20 may include a processor 21, a memory 22, and a computer program 23 stored in the memory 22 which is able to be executed in the processor. When the computer program 23 is executed by the processor 21, to execute the image processing method provided by various embodiments of the present disclosure. In another embodiment, when the computer program 23 is executed by the processor 21, the functions of each module/unit of the image processing device provided by various embodiments of the present disclosure may be realized.

The image forming device 20 may include, but is not limited to, the processor 21 and the memory 22. The embodiment shown in FIG. 6 is used as an example only to illustrate the present disclosure, and does limit the scope of the present disclosure. In some other embodiments, the image forming device 20 may include more or less components than those shown in the figure, or some components may be combined, or different components. For example, the image forming device may also include input and output devices, network access devices, buses, and the like.

The processor 21 may be a central processing unit (CPU), and may also be another general-purpose processor, a digital signal processor (DSP), an application specific integrated circuit (ASIC), a field-programmable gate array (FPGA) or another programmable logic device, a discrete gate or transistor logic device, a discrete hardware component, and so on. A general-purpose processor may be a microprocessor, or any conventional processor.

The memory 22 may be an internal storage unit of the image forming device 20, such as a hard disk or a memory of the image forming device 20. The memory 22 may also be an external storage device of the image forming device 20, such as a plug-in hard disk equipped on the image forming device 20, a smart media card (SMC), a secure digital (SD) card, a flash card, and so on. Further, the memory 22 may also include both an internal storage unit of the image forming device 20 and an external storage device. The memory 22 may be configured to store computer programs and other programs and data required by the image forming device 20. The memory 22 may also be used to temporarily store data that has been output or will be output.

The present disclosure also provides an electronic device. The electronic device may include one or more processors, a memory, and one or more computer programs. The one or more computer programs may be stored in the memory, and may include instructions. When the instructions are executed by the electronic device, the electronic device may be controlled to execute the image processing method provided by various embodiments of the present disclosure.

Figure 7:
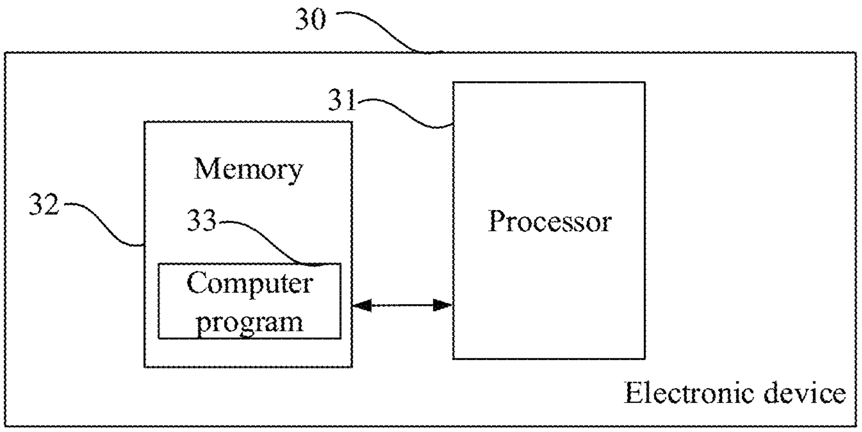
FIG. 7 illustrates an exemplary electronic device according to various disclosed embodiments of the present disclosure.

In one embodiment, as shown in FIG. 7, the electronic device 30 may include a processor 31, a memory 32, and a computer program 33 stored in the memory 32 which is able to be executed in the processor 31. When the computer program 33 is executed by the processor 31, to execute the image processing method provided by various embodiments of the present disclosure. In another embodiment, when the computer program 33 is executed by the processor 31, the functions of each module/unit of the image processing device provided by various embodiments of the present disclosure may be realized.

The electronic device 30 may include, but is not limited to the processor 31 and the memory 32. The embodiment shown in FIG. 7 is used as an example only to illustrate the present disclosure, and does limit the scope of the present disclosure. In some other embodiments, the electronic device 30 may include more or less components than those shown in the figure, or some components may be combined, or different components. For example, the image forming device may also include input and output devices, network access devices, buses, and the like.

The processor 31 may be a central processing unit (CPU), and may also be another general-purpose processor, a digital signal processor (DSP), an application specific integrated circuit (ASIC), a field-programmable gate array (FPGA) or another programmable logic device, a discrete gate or transistor logic device, a discrete hardware component, and so on. A general-purpose processor may be a microprocessor, or any conventional processor.

The memory 32 may be an internal storage unit of the electronic device 30, such as a hard disk or a memory of the electronic device 30. The memory 32 may also be an external storage device of the electronic device 30, such as a plug-in hard disk equipped on the electronic device 30, a smart media card (SMC), a secure digital (SD) card, a flash card, and so on. Further, the memory 32 may also include both an internal storage unit of the electronic device 30 and an external storage device. The memory 32 may be configured to store computer programs and other programs and data required by the electronic device 30. The memory 32 may also be used to temporarily store data that has been output or will be output.

The embodiments disclosed herein are exemplary only. Other applications, advantages, alternations, modifications, or equivalents to the disclosed embodiments are obvious to those skilled in the art and are intended to be encompassed within the scope of the present disclosure. In some cases, the actions or steps recited in the present disclosure may be performed in an order different from that in the embodiments and still achieve desirable results. In addition, the processes depicted in the accompanying figures do not necessarily require the particular order shown, or sequential order, to achieve desirable results. Multitasking and parallel processing may be also possible or may be advantageous in certain embodiments.

In the present disclosure, the terms including "one embodiment", "some embodiments", "example", "specific examples", or "some examples" mean that a particular feature, structure, material, or characteristic described in connection with the embodiments or examples may be included in at least one embodiment or example of the present disclosure. In the present disclosure, the schematic representations of the above terms are not necessarily directed to the same embodiment or example. Furthermore, the described specific features, structures, materials or characteristics may be combined in any suitable manner in any one or more embodiments or examples. In addition, those skilled in the art may combine different embodiments or examples and features of different embodiments or examples described in this specification without conflicting with each other.

The terms "first" and "second" are used for descriptive purposes only, and cannot be understood as indicating or implying relative importance or implicitly specifying the quantity of indicated technical features. Thus, the features defined as "first" and "second" may explicitly or implicitly include at least one of these features. In the present disclosure, "plurality" means at least two, such as two, three, etc., unless otherwise specifically defined.

Any process or method descriptions in flowcharts or otherwise described herein may be understood to represent modules, segments or portions of code comprising one or more executable instructions for implementing custom logical functions or steps of a process, and the scope of preferred embodiments of this specification includes alternative implementations in which functions may be performed out of the order shown or discussed, including in substantially simultaneous fashion or in reverse order depending on the functions involved.

Depending on the context, the word "if" as used herein may be interpreted as "at" or "when" or "in response to determining" or "in response to detecting". Similarly, depending on the context, the phrases "if determined" or "if detected (the stated condition or event)" could be interpreted as "when determined" or "in response to the determination" or "when detected (the stated condition or event)" or "in response to detection of (stated condition or event)".

In the present disclosure, the disclosed systems, devices or methods can be implemented in other ways. For example, the device embodiments described above are only illustrative. For example, the division of the units is only a logical function division. In actual implementation, there may be other division methods. For example, multiple units or components may be combined or may be integrated into another system, or some features may be ignored or not implemented. In another point, the mutual coupling or direct coupling or communication connection shown or discussed may be through some interfaces, and the indirect coupling or communication connection of devices or units may be in electrical, mechanical or other forms.

Each functional unit in each embodiment of the present disclosure may be integrated into one processing unit, or each unit may exist separately physically, or two or more units may be integrated into one unit. The above-mentioned integrated units can be implemented in the form of hardware, or in the form of hardware plus software functional units.

The integrated units implemented in the form of software functional units may be stored in a computer-readable storage medium. The above-mentioned software functional units may be stored in a storage medium, including several instructions to enable a computer device (which may be a personal computer, a connector, or a network device, etc.) or a processor to execute a portion of the methods described in each embodiment of the present disclosure. The aforementioned storage media may include medium that can store program code such as a flash disk, a mobile hard disk, read-only memory (ROM), random access memory (RAM), magnetic disk or optical disc, etc.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. An image processing method, comprising:

obtaining an initially processed image after a predetermined process on a source image such that the initially processed image has reduced amount of image data while retaining characteristics of source image data, and further processing the initially processed image to obtain a target image by operations comprising:

performing a first division on the initially processed image to obtain a plurality of first sub-image regions;

when it is determined that image parameters of the plurality of first sub-image regions do not meet a first preset condition, performing a second division on the plurality of first sub-image regions, to obtain a plurality of second sub-image regions;

performing attribute identification on each second sub-image region of the plurality of second sub-image regions to obtain an identification attribute of each second sub-image region;

according to an image processing method corresponding to the identification attribute of each second sub-image region, performing image processing on each second sub-image region by parallel processing of the plurality of second sub-image regions to obtain a third sub-image region; and merging a plurality of third sub-image regions to obtain the target image.

2. The method according to claim 1, wherein performing the first division on the initially processed image to obtain the plurality of first sub-image regions includes:

performing the first division on the initially processed image according to a set size of a first division region, to obtain the plurality of first sub-image regions.

3. The method according to claim 1, wherein performing the second division on the plurality of first sub-image regions to obtain the plurality of second sub-image regions includes:

performing the second division on the plurality of first sub-image regions according to a set size of a second division region, to obtain the plurality of second sub-image regions.

4. The method according to claim 1, wherein:

the first preset condition includes that absolute values of difference between the image parameters and set target parameters are less than a set threshold.

5. The method according to claim 4, wherein the image parameters include at least one of recognition accuracy, degree of blur, signal-to-noise ratio, or a number of noise points.

6. The method according to claim 1, wherein performing the attribute identification on each second sub-image region of the plurality of second sub-image regions to obtain the identification attribute of each second sub-image region includes:

according to image content of the second sub-image region, determining whether the identification attribute of the second sub-image region is a first attribute or a second attribute, wherein the image processing method corresponding to the first attribute is a first image processing method and the image processing method corresponding to the second attribute is a second image processing method.

7. The method according to claim 6, wherein:

the image content includes at least one of images, text, or background.

8. The method according to claim 6, wherein:

the first image processing method includes at least one of thickening, color enhancement, or sharpening; and the second image processing method includes shading adjustment and/or color adjustment.

9. The method according to claim 1, wherein:

the predetermined process on the source image is performed according to a set sampling rule to obtain the initially processed image.

10. The method according to claim 9, wherein:

the sampling rule includes sampling resolution and/or image color mode.

11. The method according to claim 1, further comprising:

when it is determined that the image parameters of the plurality of first sub-image regions satisfy the first preset condition, performing attribute identification on each first sub-image region to obtain an identification attribute of each first sub-image region; and when it is determined that the identification attributes of the plurality of first sub-image regions do not meet the second preset condition, performing the second division on the plurality of first sub-image regions to obtain the plurality of second sub-image regions.

12. The method according to claim 1, further comprising:

when it is determined that the image parameters of the plurality of first sub-image regions satisfy the first preset condition, performing attribute identification on each first sub-image region to obtain an identification attribute of each first sub-image region; and when it is determined that the identification attributes of the plurality of the first sub-image regions do not meet a second preset condition, performing the predetermined process on the source image according to a set new sampling rule to obtain the initially processed image, and performing the first division on the obtained initially processed image to obtain a plurality of new first sub-image regions, or performing the first division on the obtained initially processed image to obtain a plurality of new first sub-image regions according to a size of a third divided region, or performing the predetermined process on the source image according to a set new sampling rule to obtain the initially processed image and performing the first division on the obtained initially processed image to obtain a plurality of new first sub-image regions according to a size of a third divided region.

13. An image forming device, comprising:

an image forming control unit, configured to control an image forming unit to form images on a substrate, and further configured to:

obtain an initially processed image after a predetermined process on a source image such that the initially processed image has reduced amount of image data while retaining characteristics of source image data;

perform a first division on the initially processed image to obtain a plurality of first sub-image regions;

when it is determined that image parameters of the plurality of first sub-image regions do not meet a first preset condition, perform a second division on the plurality of first sub-image regions, to obtain a plurality of second sub-image regions;

perform attribute identification on each second sub-image region of the plurality of second sub-image regions to obtain an identification attribute of each second sub-image region;

according to an image processing method corresponding to the identification attribute of each second sub-image region, perform image processing on each second sub-image region by parallel processing of the plurality of second sub-image regions to obtain a third sub-image region; and merge a plurality of third sub-image regions to obtain a target image.

14. The device according to claim 13, wherein the image forming control unit is further configured to:

perform the first division on the initially processed image according to a set size of a first division region, to obtain the plurality of first sub-image regions.

15. The device according to claim 13, wherein the image forming control unit is further configured to:

perform the second division on the plurality of first sub-image regions according to a set size of a second division region, to obtain the plurality of second sub-image regions.

16. The device according to claim 13, wherein the first preset condition includes that absolute values of difference between the image parameters and set target parameters are less than a set threshold.

17. The device according to claim 16, wherein the image parameters include at least one of recognition accuracy, degree of blur, signal-to-noise ratio, or a number of noise points.

18. The device according to claim 13, wherein the image forming control unit is further configured to:

according to image content of the second sub-image region, determine whether the identification attribute of the second sub-image region is a first attribute or a second attribute, wherein the image processing method corresponding to the first attribute is a first image processing method and the image processing method corresponding to the second attribute is a second image processing method.

19. The device according to claim 18, wherein the image content includes at least one of images, text, or background.

20. An electronic device, comprising:

one or more processors and a memory storing computer program instructions that, when being executed, cause the one or more processors to:

obtain an initially processed image after a predetermined process on a source image such that the initially processed image has reduced amount of image data while retaining characteristics of source image data;

perform a first division on the initially image to obtain a plurality of first sub-image regions;

when it is determined that image parameters of the plurality of first sub-image regions do not meet a first preset condition, perform a second division on the plurality of first sub-image regions, to obtain a plurality of second sub-image regions;

perform attribute identification on each second sub-image region of the plurality of second sub-image regions to obtain an identification attribute of each second sub-image region;

according to an image processing method corresponding to the identification attribute of each second sub-image region, perform image processing on each second sub-image region by parallel processing of the plurality of second sub-image regions to obtain a third sub-image region; and merge a plurality of third sub-image regions to obtain a target image.

* * * * *